United States Patent
Kaler (10) Patent No.: US 7,881,316 B2
(45) Date of Patent: *Feb. 1, 2011

(54) MULTIPLE PEER GROUPS FOR EFFICIENT SCALABLE COMPUTING

(75) Inventor: Christopher G. Kaler, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 617 days.

This patent is subject to a terminal disclaimer.

(21) Appl. No.: 11/536,944

(22) Filed: Sep. 29, 2006

(65) Prior Publication Data

US 2008/0080528 A1 Apr. 3, 2008

(51) Int. Cl.
*H04L 12/28* (2006.01)
*H04L 12/56* (2006.01)

(52) U.S. Cl. .................. 370/401; 370/465; 709/208; 709/209; 709/210

(58) Field of Classification Search ............ None
See application file for complete search history.

(56) References Cited

U.S. PATENT DOCUMENTS

| | | | |
|---|---|---|---|
| 5,831,975 A * | 11/1998 | Chen et al. ........... | 370/256 |
| 6,553,423 B1 | 4/2003 | Chen | |
| 6,826,182 B1 | 11/2004 | Parthasarathy | |
| 6,848,109 B1 | 1/2005 | Kuhn | |
| 6,898,642 B2 | 5/2005 | Chafle et al. | |
| 6,938,042 B2 | 8/2005 | Aboulhosn et al. | |
| 7,010,622 B1 | 3/2006 | Bauer et al. | |
| 7,051,053 B2 | 5/2006 | Sinha | |
| 2002/0003506 A1 | 1/2002 | Freiberger | |
| 2002/0107934 A1 | 8/2002 | Lowery et al. | |
| 2002/0147771 A1 | 10/2002 | Traversat et al. | |
| 2003/0041141 A1 * | 2/2003 | Abdelaziz et al. ....... | 709/223 |
| 2003/0147108 A1 | 8/2003 | Gonzalez et al. | |

(Continued)

FOREIGN PATENT DOCUMENTS

WO WO02056182 A2 7/2002

(Continued)

OTHER PUBLICATIONS

Overeinder, B.J. et al., "Integrating Peer-to-Peer Networking and Computing in the AgentScape Framework" In: Peer-to Peer Computing, 2002. (P2P 2002). Proceedings. Second International Conference on 2002, pp. 96-103, ISBN 0-7695-1810-9.

(Continued)

*Primary Examiner*—Daniel J Ryman
*Assistant Examiner*—Jae Y Lee
(74) *Attorney, Agent, or Firm*—Workman Nydegger (57) ABSTRACT

Multiple peer groups for performing computing, communication, and/or storage tasks. A method may be performed for example, in a computing environment including one or more agents networked together. The method includes providing data to the agents using two or more distinct peer groups. The peer groups include members from among the agents. The method further includes performing at each of the peer groups operations on the data. Each peer group is configured to perform a specific operation. The method also includes coordinating the operations at each of the peer groups such that a common computing, communication and/or storage task is accomplished by aggregating the operations at each of the peer groups.

17 Claims, 4 Drawing Sheets

U.S. PATENT DOCUMENTS

| | | | |
|---|---|---|---|
| 2004/0064548 A1 | 4/2004 | Adams et al. | |
| 2004/0073659 A1 | 4/2004 | Rajsic | |
| 2004/0088348 A1 | 5/2004 | Yeager | |
| 2004/0098377 A1 | 5/2004 | Kraft et al. | |
| 2004/0098447 A1* | 5/2004 | Verbeke et al. | 709/201 |
| 2004/0133640 A1 | 7/2004 | Yeager | |
| 2004/0260799 A1 | 12/2004 | Bates et al. | |
| 2005/0033808 A1 | 2/2005 | Cheng | |
| 2005/0105905 A1 | 5/2005 | Ovadia et al. | |
| 2005/0114854 A1 | 5/2005 | Padisetty et al. | |
| 2005/0131894 A1 | 6/2005 | Vuong | |
| 2005/0163061 A1 | 7/2005 | Piercey et al. | |
| 2006/0165040 A1 | 7/2006 | Rathod et al. | |
| 2006/0190427 A1 | 8/2006 | Peters | |

FOREIGN PATENT DOCUMENTS

WO     WO2004039031 A3     5/2004

OTHER PUBLICATIONS

Jelasity, M.et al., "An Approachto Massively Distributed Aggregate Computing on Peer-to-Peer Networks" In: Parallel, Distributed and Network-Based Processing, 2004. Proceedings. 12th Euromicro Conference on, Feb. 11-13, 2004, pp. 200-207, ISBN 0-7695-2083-9.
Cisco Systems; Configuring ATM Routing and PNNI; Dynamic Versus Static ATM Routing, 59 pages, http://www.cisco.com/en/US/products/hw/switches/ps1893/products_configuration_guide_chapter09186a00800f6565.html.
Suzuki, et al., Dynamic Reconfiguration of Network Applications and Middleware Systems in the Bio-Networking Architecture, 2002 IEEE, 6 pages, http://www.cs.umb.edu/~jxs/pub/lartes02.pdf.
Maghraoui, et al., Network Sensitive Reconfiguration of Distributed Applications, 10 pages http://www.cs.rpi.edu/research/pdf/05-03.pdf.
Warwick, Department of Computer Science, Performance-Responsive Middleware; Multi-domain Management, Dec. 12, 2004, The University of Warwick, 9 pages, http://www.dcs.warwick.ac.uk/research/hpsg/middleware/middleware.html.
MIT Project Oxygen, Network technologies; Approach, Jun. 2, 2004, 6 pages, http://oxygen.lcs.mit.edu/Network.html.
McCann, et al., University of California, Berkeley, Receiver-driven Layered Multicast, Aug. 1996, pp. 1-14.
Eriksson, MBONE: The Multicast Backbone, Aug. 1994, 11 pages.
Kasera, et al., Scalable Reliable Multicast Using Multiple Multicast Groups, Oct. 1996, pp. 1-13.
Waldvogel, et al., Efficient Media-on-demand over multiple Multicast groups, pp. 1-5.
Schilit, et al., Disseminating Active Map Information to Mobile Hosts, pp. 1-23.
Theimer, Microsoft Research, Curriculum Vitae, 6 pages.
Taylor, et al, Supporting Peer-2-Peer Interactions in the Consumer Grid, http://www.trianacode.org/papers/pdf/HIPS_ConsumerGrid_2003.pdf.
Roure, et al., The Evolution of the Grid, http://www.semanticgrid.org/documents/evolution/evolution.pdf.
Miika Tuisku, Wireless Java-enabled MIDP devices as peers in a Grid infrastructure, http://gridblocks.sourceforge.net/download/wireless.pdf.
Karan Bhatia, Peer-To-Peer Requirements on the Open Grid Services Architecture Framework, Jul. 12, 2005, http://www.gridforum.org/documents/GFD.49.pdf.
U.S. Appl. No. 11/536,955, filed Sep. 29, 2006, Kaler.
U.S. Appl. No. 11/536,967, filed Sep. 29, 2006, Kaler.
U.S. Appl. No. 11/536,984, filed Sep. 29, 2006, Kaler.
Office Action dated Apr. 9, 2009 cited in U.S. Appl. No. 11/536,955.
Office Action dated Apr. 13, 2009 cited in U.S. Appl. No. 11/536,967.
Tang, Jia. An Agent-Based Peer-to-Peer Grid Computing Architecture. Oct. 2005, pp. v-95.
Office Action dated May 8, 2009 cited in U.S. Appl. No. 11/536,984.
Office Action dated Oct. 28, 2009 cited in U.S. Appl. No. 11/536,955.

* cited by examiner

Fig. 5

MULTIPLE PEER GROUPS FOR EFFICIENT SCALABLE COMPUTING

BACKGROUND

Background and Relevant Art

Modern computers often include functionality for connecting to other computers. For example, a modern home computer may include a modem for dial-up connection to internet service provider servers, email servers, directly to other computers, etc. In addition, nearly all home computers come equipped with a network interface port such as an RJ-45 Ethernet port complying with IEE 802.3 standards. This network port, as well as other connections such as various wireless and hardwired connections can be used to interconnect computers.

Computers can be interconnected in various topologies. For example, one topology is a client-server topology. In a client server topology, a central authority maintains control over the network organization. The central authority can provide routing functionality by providing network addresses to clients on the network. When the central authority becomes disabled or non-functional, network communications can be hampered or completely disabled.

Another type of topology is a peer-to-peer network. Peer-to-peer networks are formed as a self selected group assembled for a purpose. The peers in a peer-to-peer network can identify network members by providing and examining tokens, sharing a common encryption or key, running a common application, and the In one example of peer group communications, each peer in a peer group is aware of a subset of all of the peers in the peer group. If a peer decides to send a message, the peer will send the message to all of the peers of which it is aware. Each of those peers will send the message to the peers of which they are aware. In this fashion, messages are flooded to the peer group.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

In one embodiment, a method of performing computing, communication, and/or storage tasks is illustrated. The method may be performed for example, in a computing environment including one or more agents networked together. The method includes providing data to the agents using two or more distinct peer groups. The peer groups include members from among the agents. The method further includes performing at each of the peer groups operations on the data. Each peer group is configured to perform a specific operation. The method also includes coordinating the operations at each of the peer groups such that a common computing, communication and/or storage task is accomplished by aggregating the operations at each of the peer groups.

In another embodiment, an alternate method of performing computing, communication, and/or storage tasks is illustrated. The embodiment may be practiced, for example, in a computing environment including one or more agents networked together. The method includes obtaining membership in two or more peer groups. The method further includes using a first peer group to perform a first operation. The first operation is an operation specific to the first peer group. A second peer group is used to perform a second operation. The second operation is an operation specific to the second peer group. The embodiment further includes coordinating the first and second operations performed at the first and second peer groups such that a common computing, communication, and/or storage task is accomplished by aggregating the operations.

In a third embodiment, a system for use in a computing environment is disclosed. The computing environment includes one or more agents networked together, to perform computing, communication, and/or storage tasks. The system includes membership in a first peer group. The first peer group is configured for a first operation. The system further includes membership in a second peer group. The second peer group is configured for a second operation. The system further includes a module configured to coordinate the first and second operations such that a common computing, communication, and/or storage tasks is accomplished by aggregating the operations.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Embodiments herein may comprise a special purpose or general-purpose computer including various computer hardware, as discussed in greater detail below.

One embodiment includes a topology with a number of interconnected agents. Agents may include such as host computers, operating systems, frameworks, application code, specialized hardware and the like. The topology further includes a set of peer groups. The set of peer groups includes a number of different peer groups, where each peer group includes some or all of the agents as members. Each peer group is designed to perform a specific computing storage or communication operation. A peer group, as used herein, is an application-level construct that can employ communication mechanisms beyond physical multicasting. For example, peer groups can use multiple application level peer channels for connections to multiple peers, and/or use multiple channels for different levels of detail. Some embodiments may make use of external feedback and/or communicated information to select an optimal and/or appropriate communication mechanism to use. As illustrated below, and with specific reference to embodiments illustrated in FIG. 5, some of these embodiments may vary the communication mechanisms during the process of accomplishing a particular task. The aggregation of operations performed by peer groups in the set of peer groups results in a computing storage or communication task. Operations may be aggregated using one or more coordinating services.

Figure 1:
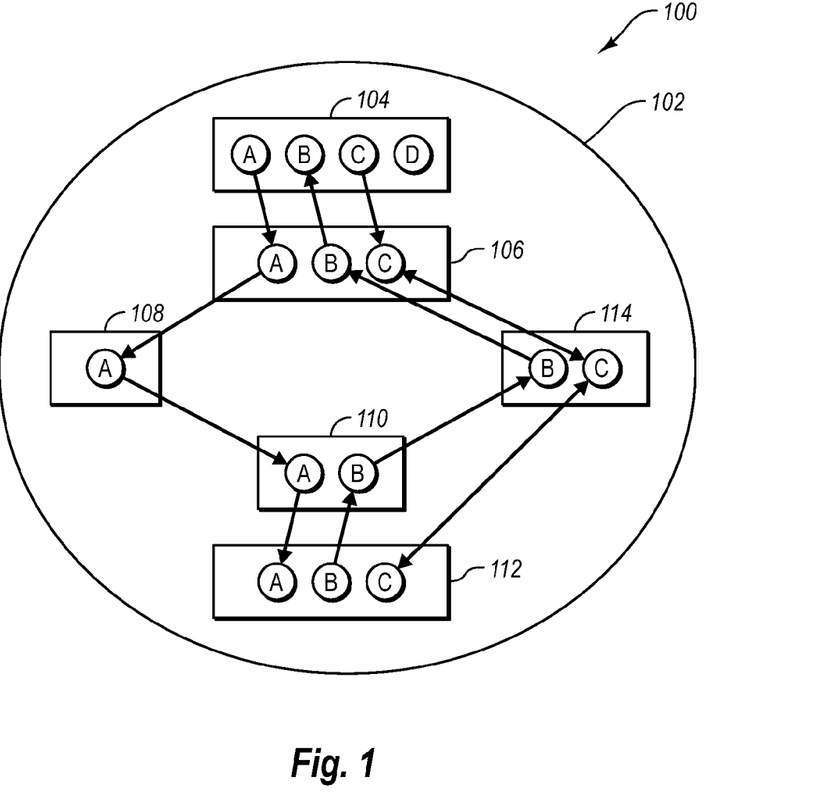
FIG. 1 illustrates a topology showing multiple peer groups.

Referring now to FIG. 1, a topology 100 is illustrated. The topology 100 includes a set of peer groups 102. The set of peer groups 102 includes a number of peer groups A, B, C, and D. Agents 104-114 are organized into the peer groups A-D, where each agent can belong to one or more peer groups. For example, agent 104 belongs to peer groups A, B, C, and D. Agent 106 belongs to peer groups A, B, and C. Agent 108 belongs to peer group A. Agent 110 belongs to peer groups A and B. Agent 112 belongs to peer groups A, B, and C. Agent 114 belongs to peer groups B and C. Embodiments make use of the peer groups A-D each performing operations to accomplish a specific computing task when the operations are aggregated.

For example, in one embodiment, requests may be handled by one peer group while responses are handled by another. By using multiple peer groups, several optimizations can be accomplished. For example, the parties that need to participate in a given communication can be limited resulting in communication optimizations, localization of network traffic, an overall reduction in network traffic, etc. Referring once again to FIG. 1, requests may be handled by peer group A while responses are handled by peer group B. FIG. 1 illustrates a request being sent using peer group A from agent 104 to agent 106, to agent 108 to agent 110 and finally to agent 112. Agent 112 sends a response using peer group B through agent 110, 114, agent 106 and finally to agent 104.

An alternate embodiment may use peer groups to accomplish caching and search tasks. For example, in one embodiment, search requests can be transmitted using a peer group, such as peer group A in FIG. 1. The search request may include an indication of a separate peer group that may be used to communicate matches. For example, the search request may indicate that peer group B is to be used to return matches. In one embodiment, matches return metadata to limit the amount of resources used. The metadata can be used to request the actual object. Requesting and receiving the actual object may occur either by using the request peer group A and the response peer group B or by using a separate peer group designated specifically for object retrieval. For example, FIG. 1 illustrates bi-directional communication occurring on peer group C. This bi-directional communication may be used to transfer an object from agent 112 to agent 104. Thus, embodiments may be implemented where searches are issued on one peer group, matches may be communicated on a second peer group, and retrieving an object may occur on yet another third peer group. Notably, depending on the degree of isolation desired or the need for distributing computing resources, peer groups may even use a finer grain. For example, peer groups may be specific to a type of search, type of data, type of response, or other fine granularity data handling.

Using the search embodiment described above, agents can create local caches to respond to requests. For example in FIG. 1, if an agent 110 has a cache, which may be a metadata file or the actual object, of the objects on agent 112, agent 112 may not need to be queried in the original search request. Rather, agent 110 can provide the match directly using peer group B. Peer group C can then be used to download the object from agent 112. One embodiment may use distributed hash table (DHT) style look-ups for specific search topics.

The embodiments described above illustrate the use of peer groups A, B, C, and D. Notably, the peer groups can be logical or physical peer groups. Logical peer groups are peer groups that are perceived by applications but may use one or more physical peer groups. Embodiments herein may use any combination of both logical and physical peer groups, including embodiments with all logical peer groups or all physical peer groups, or any combination in between.

Workspace Framework

Figure 2:
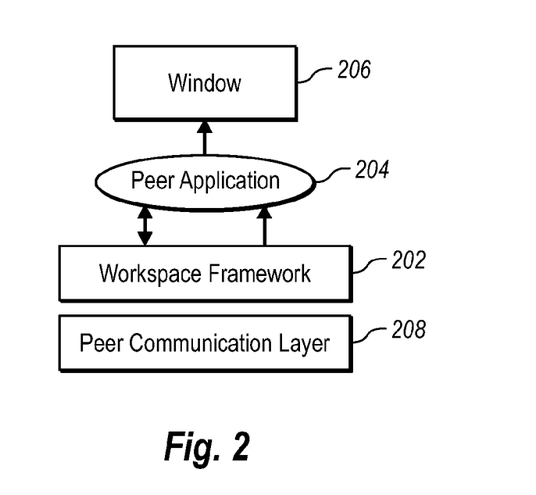
FIG. 2 illustrates an application making use of peer group communication.

One exemplary embodiment may be used to integrate multiple peer groups into a single desktop paradigm. FIG. 2 illustrates one example of such an embodiment. FIG. 2 illustrates a workspace framework 202. The workspace framework 202 may serve as a proxy for presence and as a launchpad for peer applications 204. For example, the workspace framework 202 can receive messages from the peer communication layer 208 intended for a peer application 204. The workspace framework 202 can provide presence information in that the workspace framework 202 indicates that a peer using the peer application 204 is present and able to communicate on a peer group. The workspace framework 202 can also launch a peer application 204, such as by executing an application component or connecting to an already executing component, when messages are received for the peer application 204.

Peer applications 204 may run as separate classes but use windows 206 hosted and managed by the workspace framework 202. The workspace framework 202, in one example, provides logically separate peer groups for each peer application 204. For example, the peer communication layer 208 provides a number of peer groups such as those shown in FIG. 1. Communications on the peer groups can be coordinated and aggregated by the workspace framework 202. Notably, peer applications 204 may coordinate and share physical peer groups or coordinate peer group activities.

The workspace framework 202 can further provide services. Some of these services may be local such as logging. Other services may be distributed using multiple separate peer groups. For example, one service provided by the workspace framework 202 may be a service that establishes a master for providing various services. Services may also establish a backup to the master that is available to replace the master in case of system crashes or failures.

Media Sharing Applications

One embodiment may be used to create a media sharing application. In the media sharing application, categories are created for media. Each category uses a separate peer group. As noted previously, each peer group may be logical or physical. When a user desires to share media, a media file may be placed into the peer group for the category. In one embodiment, each agent includes a folder corresponding to each peer group. When a user desires to share media, the media can be placed in the folder where it will be shared to all members of the peer group corresponding to the folder. Users can select which categories they desire to view. This can be done by joining the peer group for the category. Data can be replicated either lazily or based on multiple parameters to peers in a peer group. Replication may occur in one embodiment based on various rules. For example, the rules may specify when to replicate, how much to retain, etc.

Shared media can be used locally. For example, when the media is visual media, such as pictures or video, the media may be built into a screen saver. Rules can be assigned to each category to control how the media is used. For example, in the screen saver embodiment, a percentage rule may be applied to each category. In this way, pictures in certain categories may be displayed more often the pictures in other categories. Each user can specify rules, such as percentages and the like. Notably, rules may be used for other types of media as well. For example, when the media is audio media, such as music, certain categories of music may be played more frequently than others.

As alluded to above, there is no requirement for using a centralized server in the embodiment shown and the media is replicated either automatically or based on a set of rules.

Media may be selected by selecting a category as opposed to selecting from a large pool of media. Each peer group organizes data as a category and allows contextual access and replication based on the category of the peer group.

In one exemplary embodiment, a group of individuals may desire to share pictures. A peer group can be established for each individual to replicate that individual's pictures. Others can join peer groups corresponding to individual's pictures in which they have an interest. A user can specify importance or frequency percentages, which in turn determines how pictures from all peer groups that an individual subscribes to will be displayed.

In one embodiment, multiple peer groups can be used as publication/subscription points allowing for optimized distribution using the locality of subscribers. On these peer group channels there is full replication. That is, the peer group channels are not used to provide different levels of detail or parts of some whole. The objects are shared in whole.

Multistream Replication

One embodiment uses multiple peer groups with a single request to achieve parallel downloads of objects and pieces of large objects. Multiple peers listening on peer groups may have data and have the ability to provide data to other peers that may need the data. In this example, multiple peer groups are used to localize and optimize traffic. Proximal routing may also be used to optimize network traffic.

In one embodiment, two peer groups are used which support downloads of files of related to particular topic. A first peer group may be addressed by referencing a first address such as "ReqAddr." A first class of peers in the ReqAddr peer group is a class of peers wishing to download. A second class of peers in the ReqAddr peer group is a class of listeners offering to download. Any peer from the first class may choose to add itself to the second class if it can serve up the data.

A second peer group may be addressed by referencing a second address such as for example, "DownAddr." The DownAddr peer group is a peer group to which downloaded data is sent. In the DownAddr peer group, listeners belong to a class of peers that wish to receive data and senders belong to a class of peers that have data available. The DownAddr peer group may be viewed as virtually an inverse of the ReqAddr peer group.

When a peer wishes to download a specific file, it makes a GET request to the ReqAddr peer group with an indication that only one response is needed. The GET request gets routed to a random node, in one embodiment to the closest proximty peer listening on this group. The result is sent to the DownAddr peer group where any peer interested in the result receives it.

Caching Peers

In one embodiment, two classes of caching peers may be implemented: pure caches and caching clients. Pure caches include peers in the network whose job is to cache and serve data. The second class represents peers who download because they want the data are and willing to serve the data to other peers.

A pure cache peer registers as a receiver in the DownAddr peer group and once it has the data to serve it can add itself to the ReqAddr peer group as a listener. It may actively make requests of the ReqAddr peer group to obtain the data if there is no other activity.

A caching client peer sends requests to the ReqAddr peer group and listens for results on DownAddr peer group. Once the caching client peer has the data they are then added as a listener on the ReqAddr peer group during the periods the caching client peer is available to process requests.

Downloading Collections

Embodiments also support downloading of collections. Collections may be, for example, a set of tracks, chapters, works, articles, and the like. When a collection is requested, a manifest is downloaded. Requests are then made for each item in the collection based on information in the manifest. Requests for each item may be made as outlined above. As an optimization, the items of the collection may be requested randomly as other peers requesting at the same time may request the other items and reduce the total requests in the system because items are delivered to all listening peers. Additionally, some embodiments include functionality where separate peer groups are identified for each portion of the collection or for some subset of the collection.

Partial Files

In a similar embodiment, large objects may be requested by using a partial segment manifest. A partial segment manifest may be downloaded. Requests can then be made for each partial segment of the large object. As partial segments are received they can be recombined. As with collections, partial segments may be requested in random order for the same optimization reasons outlined above. Additionally, separate peer groups are identified for portions of the large objects.

Caches with Partial Results

For collections or large objects which are fragmented, peers providing downloads may wait until items in a collection of partial segments of large objects are available at the peers providing downloads. In alternative embodiments, better load balancing may be achieved if the peers providing downloads can send partial results. In particular, by using proximities, load balancing may be made more efficient. In this alternative embodiment, a peer providing downloads may be selected for requests for which they do not have an item or partial segment. This situation is resolved by re-issuing the original request and letting another peer provide downloads be selected.

To ensure optimal processing, two or more requests may be issued. The first request is to any random peer providing downloads, other than the peer sending the request, that is in an inner proximity of the peer sending the request allowing data to be quickly supplied. The second request is to outer proximities such that if the requested data is not on a proximal peer the data can be obtained from another peer. In one embodiment requests may be sent to peers at random with an exclusion list option to eliminate less efficient, non-proximal or other peers.

Load Balancing

One concern with the multi-stream replication is balancing loads. For example, if there are 50 peers that can serve up a file and one peer gets a disproportionate number of requests, then utilization may not, in some embodiments, be at an optimal level. It will be noted however, that in some embodiments a peer may be able to effectively service the disproportionate traffic. One embodiment implementing load balancing is accomplished when requests are sent to a random single peer providing downloads to statistically balance load across the available peers providing downloads.

In addition, when a message is sent with the "Send to any ONE peer in the group" it can be given additional parameters. As discussed, one might indicate that the peer should be chosen at random within the nearest proximity or from the next outer proximity. The downloading system could recognize that outer proximities are still reasonable to use and provide additional hints to leverage a large pool. As with other embodiments described herein, load balancing embodiments may include functionality where multiple peer groups can be used to obtain different pieces of objects, collections and the like to better balance loads on the network.

Security Model

Data may be secured in a number of ways. In one example, security on the peer groups can be restricted so that only trusted parties can send data. In a second example, each message may be secured to ensure that it is not altered. In another example, all manifests may identify signed digest values of the expected parts to ensure that partial results and re-ordering attacks cannot occur. In yet another example, the manifests may be signed or secured to the recipient.

Embodiments may also be implemented where multiple peer groups are used to allow for different levels of security. For example, one peer group can be used for lower-level security clients, another peer group can be used for medium-security level security clients, and so forth. A particular level of security for a peer group could be selected, for instance based on the security desired for clients using that peer group. Alternatively, a particular level of peer group could be selected based on sensitivity of data to be transferred.

WS-Transfer Usage

In one embodiment, transfers may be implemented using Web Services. For example, requests may be made using the WS-Transfer GET method. For simple data the result may be returned in the response. For collections, a specialized manifest element may be returned in the response. This type is expected because the requestor is assumed to know they are asking for a collection. If the requester does not know, a special header in the response may be used to indicate if a manifest is being returned and that subsequent downloads are required.

For large files which are split, a specialized manifest element may be returned in the response. This type may not be expected because the client may not know the size of the object they are requesting. In this case a special header may be included in the response to indicate that subsequent downloads are required. The special header may include, for example, the manifest described previously herein.

In one alternative embodiment where large objects are not automatically split, a range header may be included in the GET request to indicate what portion of the object is desired.

Grid Computing

One embodiment using multiple peer groups includes functionality to perform grid-style computing. Each peer group can be used as a channel. One or more channels may be used to communicate requests. One or more other channels may be used to communicate responses. Still other channels may be used to download data. Still other channels may be used to communicate with compute agents or workers. In one embodiment, the communication with compute agent workers provides for failover advantages.

Figure 3A:
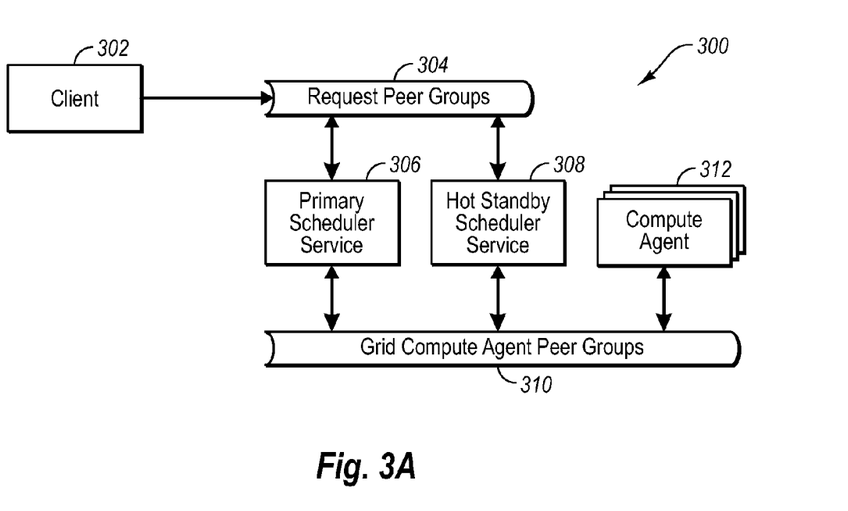
FIG. 3A peer groups used in grid computing.

Referring now to FIG. 3A, a topology 300 is illustrated showing a general architecture that may be used to facilitate grid computing. FIG. 3A illustrates a client 302 coupled to a request set of peer groups 304 that may include a number of peer group channels such as peer groups A, B, C, and D shown in FIG. 1. A client 302 sends a request for a computing task to be performed by the grid computing topology 300 by sending the request to the request set of peer groups 304. Scheduler agents, such as primary scheduler service 306 and hot standby scheduler service 308, receive requests from channels on the request set of peer groups 304. In one embodiment, different channels are used for the primary scheduler service 306 and the hot standby scheduler 308 so as to create a redundant failover configuration. The hot standby scheduler 308 can assume the duties of the primary scheduler service 306 if there is a need for the primary scheduler service 306 to shut-down or otherwise go off-line. In one embodiment, a separate peer group may be used for communications between the primary scheduler service 306 and the hot standby scheduler 308. This allows the hot standby scheduler 308 to receive information from the primary scheduler 306 so as to seamlessly assume the primary scheduler's duties when the primary scheduler service 306 is shut down or otherwise removed.

The primary scheduler service 306 and hot standby scheduler 308 communicate with a grid worker set of peer groups where compute agents 312 register. Compute agents 312 may use one peer group to register with schedulers 306 and 308, a separate group to communicate results to the schedulers 306 and 308, and yet another group to communicate results to the requesting client 302. In another alternative embodiment, separate peer groups may be used to submit requests where each peer group represents a specific client 302. This can be used to provide extra security for clients 302 by preventing other clients from having access to data intended for a specific client.

Figure 3B:
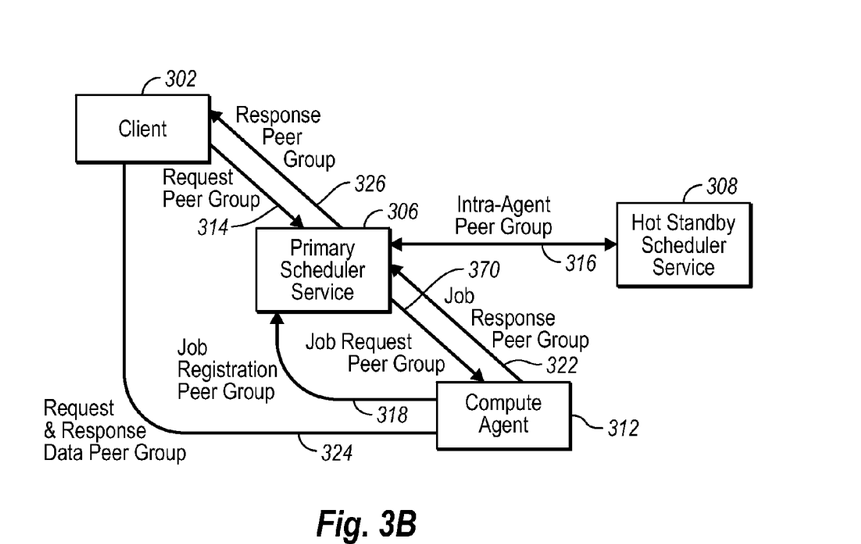
FIG. 3B further illustrates peer groups used in grid computing.

While FIG. 3A illustrates peer groups grouped together in sets of peer groups 304 and 310, FIG. 3B illustrates one example showing how peer groups may be broken out in the sets of peer groups 304 and 310. For example, FIG. 3B illustrates the client 302 sending a request on a request peer group 314 to the primary scheduler service 306. The primary scheduler service 306 can communicate information about the request through an intra-agent peer group 316 to the hot standby scheduler 308. This allows the hot standby scheduler 308 to act as a failover backup in case of failure of the primary scheduler service 306. A compute agent 312 can register with the primary scheduler service 306 through a job registration peer group 318 to inform the primary scheduler service 306 that the compute agent 312 is available to perform grid computing tasks. The primary scheduler service 306 can send requests from clients 302 using a job request peer group 320 to send requests to the compute agent 312. Notably, a particular job request can be sent to more than one compute agent 312 so as to affect a redundant system for failover capabilities. As such, just as the scheduler services can use a peer group to allow a hot standby, workers such as the compute agents 312 include redundancies to allow for a hot standby. When the compute agent 312 has completed a task, a response may be sent to the primary scheduler service 306 on a job response peer group 322. Several alternative embodiments of this may be implemented. For example one peer group could be used to communicate to and from scheduler service 306 and compute agents 312. Alternatively, there may be a peer group per compute agent 312 to communicate to the compute agent 312. This embodiment may further include a common peer group to communicate back to the scheduler service 306. These alternative embodiments each allows for different optimizations and monitoring. For example, when separate peer channels are used for each compute agent 312, security can be enhanced by protecting data intended for a particular compute agent 312 from being obtained by a different compute agent.

Additionally, the compute agent 312 can communicate directly with a client 302 through one or more request and response data peer groups 324. For example, a work request could identify a peer group to use to pull work data or push specialized request back outside of the scheduler service 306. This allows for optimizations by using fewer data copies that are more localized. The primary scheduler service 306 may communicate responses on a response peer group 326. The embodiment above illustrates one particular embodiment and it should be noted that peer groups can be combined or that additional peer groups may be used for finer granularity data handling.

Figure 4:
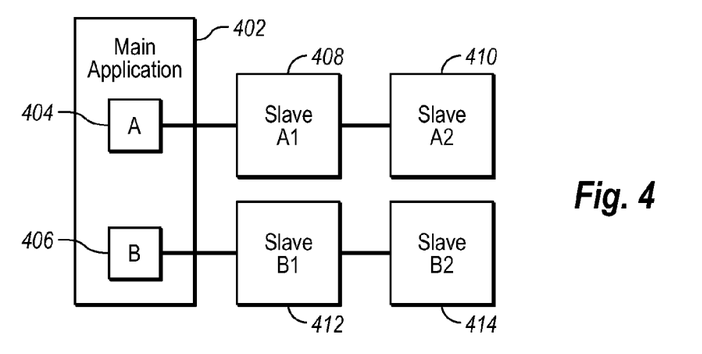
FIG. 4 illustrates peer groups used in a parallel application embodiment.

Referring now to FIG. 4 another application that makes use of multiple peer groups is shown. FIG. 4 illustrates an application 402 that performs parallel processing of tasks 404, 406. The tasks 404, 406 can each be processed by slave systems where the tasks are transmitted on the multiple peer groups. For example, FIG. 4 illustrates task A 404 being transmitted to slave A1 408 and slave A2 410 on a first peer group. Task B 406 is transmitted to slave B1 412 and slave B2 414. The tasks A and B can be aggregated by the main application 402. The processing in this embodiment may be similar to the grid computing application set forth above. In the example shown, separate peer groups may be used for groups of slave systems. For example the group of slave systems 408, 410 identified by the prefix A may communicate on one peer group while the group of slave systems identified by the prefix B communicates on a separate peer group.

Distributed Targeted Data

One aspect that may be present in some embodiments of peer networking is where peer network involves self-selecting criteria to create a peer group. Thus, wholesale distribution of targeted data can be accomplished in a fashion similar to mailing lists. Peer groups functioning as channels, or hierarchies of channels, can be used to distribute information of interest to self-selecting communities. For example, a "news peer group" may contain a hierarchy of groups for different news topics. Peers join specific groups based on their interest. Data is then sent to appropriate peer groups. Partitioning of separate, but related groups allows for detailed dissemination. For example, if the groups are organized hierarchically, messages can be sent at any level and replicated either to the groups above or below in the hierarchy.

Figure 5:
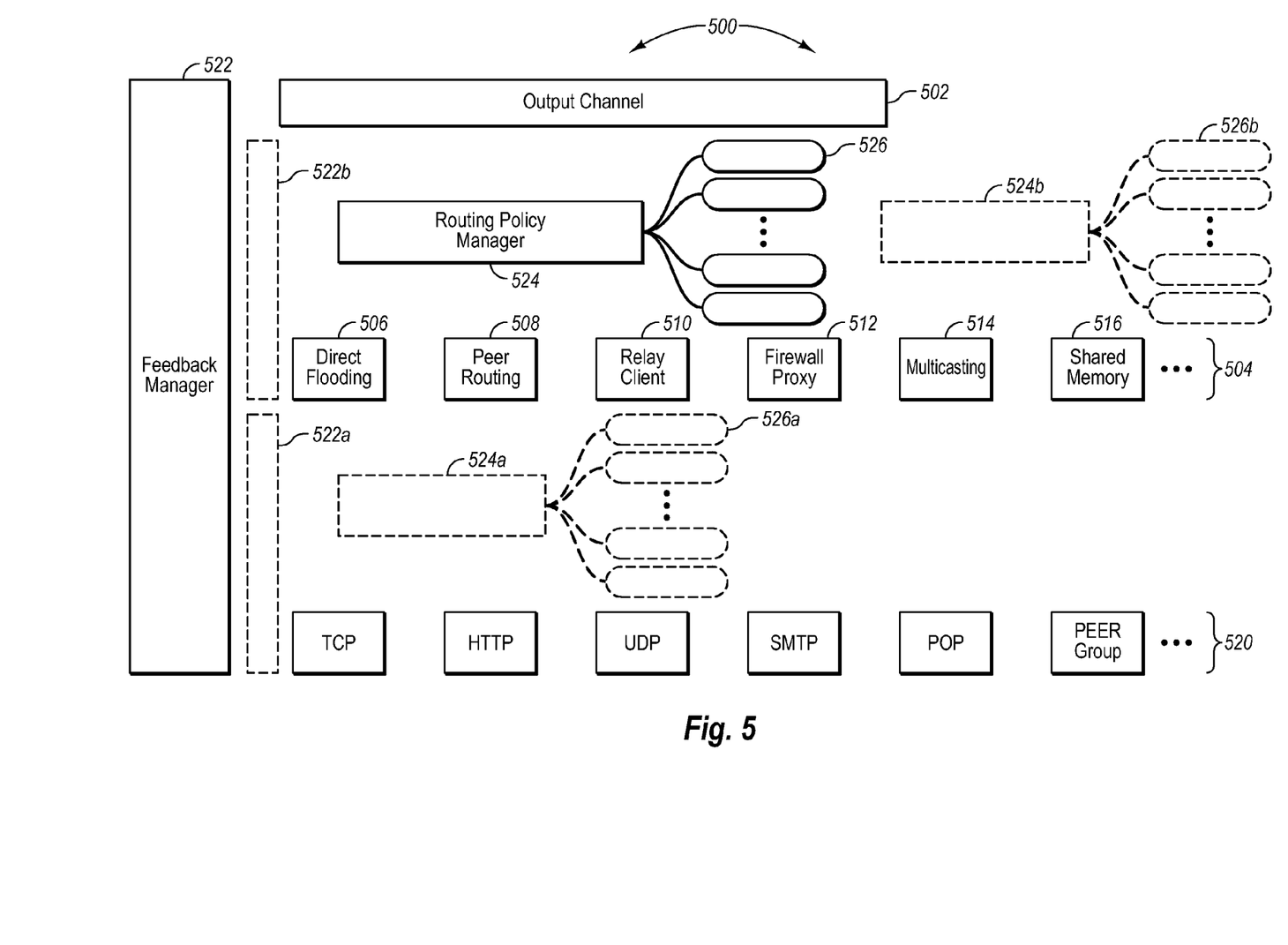
FIG. 5 illustrates a number of channels and transports.

Referring now to FIG. 5 a system 500 to transfer messages on a network between one or more interconnected agents is shown. An agent may be for example but not limited to host computers, operating systems, frameworks, application code, specialized hardware etc. The system 500 includes an output channel 502 that may be configured to connect to an application for receiving messages from the application. Notably, input channels can optionally participate for example by filtering messages already seen, etc. The application delivers messages to the output channel 502 for delivery to other agents. The system 500 further comprises one or more communication mechanisms. The communication mechanisms may include routers 504. Exemplary routers shown in FIG. 5 include direct flooding 506 peer routing 508 relay clients 510 firewall proxies 512 multicasting 514 or shared memory 516. The examples shown in FIG. 5 are purely exemplary and not exhaustive of routers that may be used. Notably, peer-to-peer agents may make use of the system 500 shown in FIG. 5. As illustrated in FIG. 5, one router is a direct flooding router 506. Direct flooding 506 allows messages to be flooded to a peer group to allow the messages to reach other peers that are members of the peer group. Additionally other peer routing 508 is illustrated in FIG. 5. Notably, even when a peer-to-peer configuration is used, other routing mechanisms may be used. As will be described in more detail below, one or more routers 504 may be used to transfer a message from an application. A message may be transferred using more than one router if it is efficient, or for other reasons, to reach intended recipients of the message.

Communication mechanisms can also include channels 520. After one or more routers 504 have been selected, the routers 504 in turn use one or more channels 520 to send messages. Exemplary channels may be TCP, http, UDP, SMTP, POP, etc. The system 500 may be used in a peer-to-peer environments. Thus, in one exemplary embodiment, the channels 520 may be peer groups. An agent using the system 500 may belong to one or more peer groups where the agent sends messages using the peer groups acting as channels 520.

The system 500 includes a feedback manager 522 configured to provide information about the network, messages on the network, participants on the network, etc. Information about the network may include for example information related to the routers 504 including network configuration and status, failed/successful connections, neighbors, etc. Information about the network may include alternatively or in addition to that noted above, information about the channels 520 for example, the information may include information related to the locality of participation, the number of known or estimated participants on a channel, security semantics, quality of service requirements, time-of-day, network congestion, size of messages, frequency of messages, channel policies, etc.

The system 500 shown in FIG. 5 further includes a routing policy manager 522 configured to receive the information about the network from the feedback manager 520. A set of policy rules 524 are coupled to the routing policy manager 522. The policy rules 524 may include logic which takes into account the information about the network from the feedback manager 520. The policy rules 524 may include information about how messages should be sent based on the logic which takes into account the information about the network from the feedback manager 520. One or more communication mechanisms are selected by the routing policy manager to send the message according to the policy rules as applied to the feedback information. The policy rules 524 may be expressed, for example, as specified code, CLR/Java objects or script.

While the example shown in FIG. 5 illustrates a routing policy manager 524 and feedback manager 522 and rules 526 used to direct messages for all communication mechanisms including the routers 504 and channels 520, other alternative embodiments may implement a finer granularity of routing policy management and feedback management. For example a channels feedback manager 522a may be used in conjunction with a channels routing policy manager 524a and channel policy rules 526a. A separate router policy feedback manager 522b, router routing policy manager 524b and router policy rules 526b may be used to facilitate message transfers. For example, the router routing policy manager 524b may be used in conjunction with the router policy rules 526b and the router feedback manager 522b to appropriately select a router 504. Similarly the channels routing policy manager 524a may be used with channels policy rules 526a and channels feedback manager 522a to select one or more appropriate channels 520.

As described previously, and with reference to FIG. 5, channels 520 available on the network may be for example TCP, http, UDP, SMPTP, and POP protocols. Additionally, as mentioned previously, one embodiment may be used where peer groups are used as channels 520. An agent may belong to one or more peer groups for peer to peer networking. Each peer groups that an agent belongs to can be used as a channel 520 for transferring messages. Notably, embodiments may be implemented where one or more channels are used to transfer messages. If a message is intended for a number of different recipients, where different channels may be used to optimize delivery for different recipients, then embodiments herein contemplate the ability to optimize message delivery using different channels for different recipients. In other words, one or more channels may be used to transfer a message.

Routers 504 available on the network may be for example, one or more of direct flooding 506, peer routing 508, a relay client 510, a firewall proxy 512, multicasting 514, or shared memory 516. As explained previously, one embodiment may be used with peer to peer communications. In these and other embodiments, direct flooding 506 and/or peer routing 508 may be used as routers 504 for a message to be transferred. Notably, embodiments may include configurations where interconnected agents reside on the same host machine. Thus, transferring a message may be accomplished by using a relay that is shared memory. In this case, a memory pointer can be may be transferred between agents to send the message.

One or more routers 504 may be selected for use. For example, if efficiencies can be obtained by using different routers 504 for a message directed to different recipients, then the message may be sent using different routers 504 for the same message to different recipients. Specifically, direct flooding 506 may be used to transfer messages to agents connected at a common hub, while the same message may be transferred to agents across a firewall through a firewall proxy 512.

Methods of Performing Tasks

Figure 6:
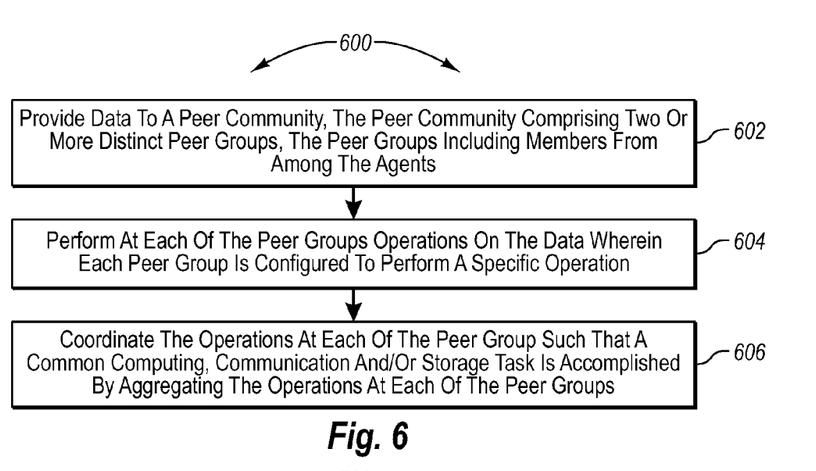
FIG. 6 illustrates a method of using multiple peer groups.

Referring now to FIG. 6, a method 600 of performing computing, communication, and/or storage tasks is illustrated. The method 600 may be performed, for example, in a computing environment including one or more agents networked together. The method includes providing data to the agents using two or more distinct peer groups (act 602). The peer groups include members from among the agents. Providing data to the agents(act 602) may include in one embodiment, proving media to the set of peer groups. The media may be distributed among the two or more distinct peer groups according to categories of the media. In one embodiment, the media includes images. In other embodiments, the media may include audio, video, or any other suitable media.

The method 600 further includes an act of performing at each of the peer groups operations on the data (act 604). Each peer group is configured to perform a specific operation. As described above, each peer group has a task that it performs. This act is not intended to limit performance of the task by only one peer group. In other words, more than one peer group may perform a given task. This limitation is merely intended to show that each peer group has a specific task for which the peer group can be called upon to perform. In one embodiment, each peer group performs operations for different applications.

Performing at each of the peer groups operations on the data (act 604) may include for example sending a search request using a first peer group, the search request including an indication of a second peer group where search matches are to be sent and receiving matches as a result of the search request at the second peer group. As described previously, receiving matches may include receiving metadata identifying actual content so as to preserve network bandwidth. In another embodiment, the method 600 may further include fetching the actual content using a third peer group.

Performing at each of the peer groups operations on the data (act 604) may further include each peer group storing a different category of data. For example, one peer group may store media, another documents, another log files, etc. In addition, the granularity may be as fine or broad as needed. For example, among narrow granularity categories, peer groups may store certain types of pictures in each peer group. In another embodiment performing at each of the peer groups operations on the data (act 604) may include each peer group delivering a different piece of a large object.

The method 600 illustrated in FIG. 6 further includes an act of coordinating the operations at each of the peer groups (act 606) such that a common computing, communication and/or storage task is accomplished by aggregating the operations at each of the peer groups. Coordinating (act 606) may be performed in one embodiment by a single application.

In one embodiment, the method 600 illustrated in FIG. 6 may be performed such that requests are sent using a first peer group and responses to the requests are received using a second peer group.

In one embodiment, the method 600 may be performed in a grid computing environment comprising a client sending requests, a scheduler service receiving requests and computer agents performing computing operations. Performing at each of the peer groups operations on the data (act 604) in this embodiment, includes clients communicating with scheduler services on a first peer group, and scheduler services communicating with computer agents on a second peer group.

In a similar embodiment, the method 600 may be performed in a parallel processing environment where each of the two or more distinct peer groups includes one or more slave agents. The slave agents are configured to receive tasks from the peer group.

Figure 7:
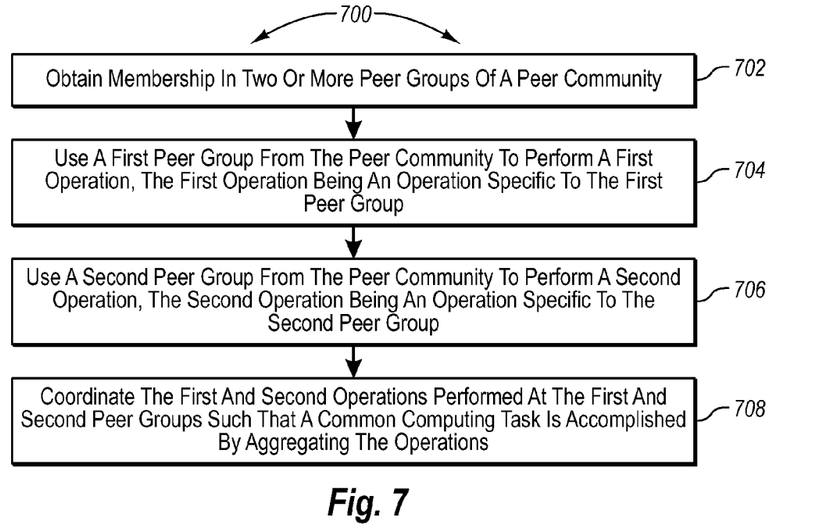
FIG. 7 illustrates an alternate method of using multiple peer groups.

Referring now to FIG. 7, another embodiment of a method 700 to perform computing, communication, and/or storage tasks is illustrated. The method may be performed, for example, in a computing environment including one or more agents networked together. The method includes obtaining membership in two or more peer groups (act 702). For example, as shown in FIG. 1, agent 104 has membership in peer groups A, B, C, and D.

The method 700 further includes using a first peer group to perform a first operation (act 704). The first operation is an operation specific to the first peer group. For example, as shown in FIG. 1, Peer group A may be used to send messages. Thus, the operation of sending messages is the operation specific to the first peer group.

The method 700 further includes an act of using a second peer group to perform a second operation (act 706). The second operation is an operation specific to the second peer group. For example, as shown in FIG. 1, the peer group B may be used to receive messages. Thus, receiving messages is the operation specific to the second peer group.

The method 700 illustrated in FIG. 7 may further include an act of coordinating the first and second operations performed at the first and second peer groups such that a common computing task is accomplished by aggregating the operations (act 708). For example, FIG. 2 illustrates a peer application 204 that may contain functionality, such as in a computing module, for coordinating operations performed at peer groups to accomplish a common computing, communication, and/or storage task is performed.

The method 700 may be performed in a grid computing environment. In one such embodiment, using a first peer group (act 704) includes electing a scheduler service as a scheduler service to coordinate tasks from clients to compute agents. In one embodiment, electing a scheduler service includes electing a secondary scheduler service configured to replace a primary scheduler service should the primary scheduler service be removed from the grid computing environment. A peer group may have a specific task of being used to elect scheduler services.

Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment including a plurality of agents networked together, a method of performing computing, communication, and/or storage tasks, the method comprising:

sending a search request for matches of a first type on a first peer group, wherein a peer group as used herein is an application level construct that employs communication techniques beyond physical multicasting, the first peer group including members from among the agents, the search request comprising a search for data, the search request further comprising an indication that matches of the request should be returned using a peer group separate from the first peer group, the request specifically designating a second peer group by identifying specifically the second peer group, wherein sending a search request is an operation specific to the first peer group;

receiving matches of the request, the matches being of the first type, on the second peer group specifically identified by the request, the second peer group including members from among the agents, wherein at least some of the agents in the second peer group are different from agents in the first peer group, wherein receiving matches of the request is an operation specific to the second peer group and wherein the second peer group is designated for specifically receiving matches of the first type and wherein matches of a different type than the first type are received on different peer groups as a result of the different peer groups being specifically identified in the request as being designated for matches of different types than the first type, including receiving through different agents, than the first and second peer groups; and coordinating the sending an receiving operations at each of the peer groups such that a common computing, communication and/or storage task is accomplished by aggregating the operations at each of the peer groups.

2. The method of claim 1, wherein the agents comprise at least one of a host computer, an operating system, a framework, application code, or specialized hardware.

3. The method of claim 1, wherein the peer groups are at least one of logical or physical peer groups.

4. The method of claim 1, further comprising using at least one of external feedback or communicated information to choose communication mechanisms.

5. The method of claim 1, wherein the coordinating is performed by a single application.

6. The method of claim 1, wherein communications between agents comprise Web services messages.

7. The method of claim 1, being performed in a single desktop paradigm, further comprising providing data to separate peer applications using separate peer groups for each peer application.

8. The method of claim 7, further comprising providing data to agents by launching a peer application by executing an application component.

9. The method of claim 7, further comprising providing data to agents by launching a peer application by connecting to an executing application component.

10. The method of claim 7, wherein one or more of the separate peer applications run as separate classes.

11. The method of claim 7, wherein the peer applications provide local services.

12. The method of claim 7, wherein the peer applications provide distributed services.

13. The method of claim 1, further comprising performing parallel processing of tasks using separate peer groups.

14. The method of claim 1, wherein different peer groups are used to facilitate different levels of security.

15. The method of claim 1, wherein peer groups are arranged hierarchically such that messages can be sent at any level and replicated to at least one of the groups above or below a given peer group in a hierarchy.

16. The method of claim 1, wherein the method is practiced using at least one of multiple desktops or virtual desktops.

17. In a computing environment including a plurality of agents networked together, a method of performing computing, communication, and/or storage tasks, the method comprising:

obtaining membership in two or more peer groups;

using a first peer group, wherein a peer group as used herein is an application level construct that employs communication techniques beyond physical multicasting, sending a search request for matches of a first type on a first peer group, the first peer group including members from among the agents, the search request comprising a search for data the search request further comprising an indication that matches of the request should be returned using a peer group separate from the first peer group, the request specifically designating a second peer group, wherein sending a search request is an operation specific to the first peer group;

using the second peer group receiving matches of the request, the matches being of the first type, on the second peer group specifically identified by the request, the second peer group including members from among the agents, wherein at least some of the agents in the second peer group are different from agents in the first peer group, wherein receiving matches of the request is an operation specific to the second peer group and wherein the second peer group is designated for specifically receiving matches of the first type and wherein matches of a different type than the first type are received on different peer groups as a result of the different peer groups being specifically identified in the request as being designated for matches of different types than the first type, including receiving through different agents, than the first and second peer groups; and using a separate third peer group to retrieve one or more objects specified in the matches of the request, wherein the third peer group is designated specifically for object retrieval and is not used for sending search requests or receiving matches.

* * * * *